3,386,500
HEAT EXCHANGER
Gordon J. Fairbanks, Indianapolis, Ind., assignor to Stewart-Warner Corporation, Chicago, Ill., a corporation of Virginia
Filed Jan. 20, 1966, Ser. No. 521,960
4 Claims. (Cl. 165—51)

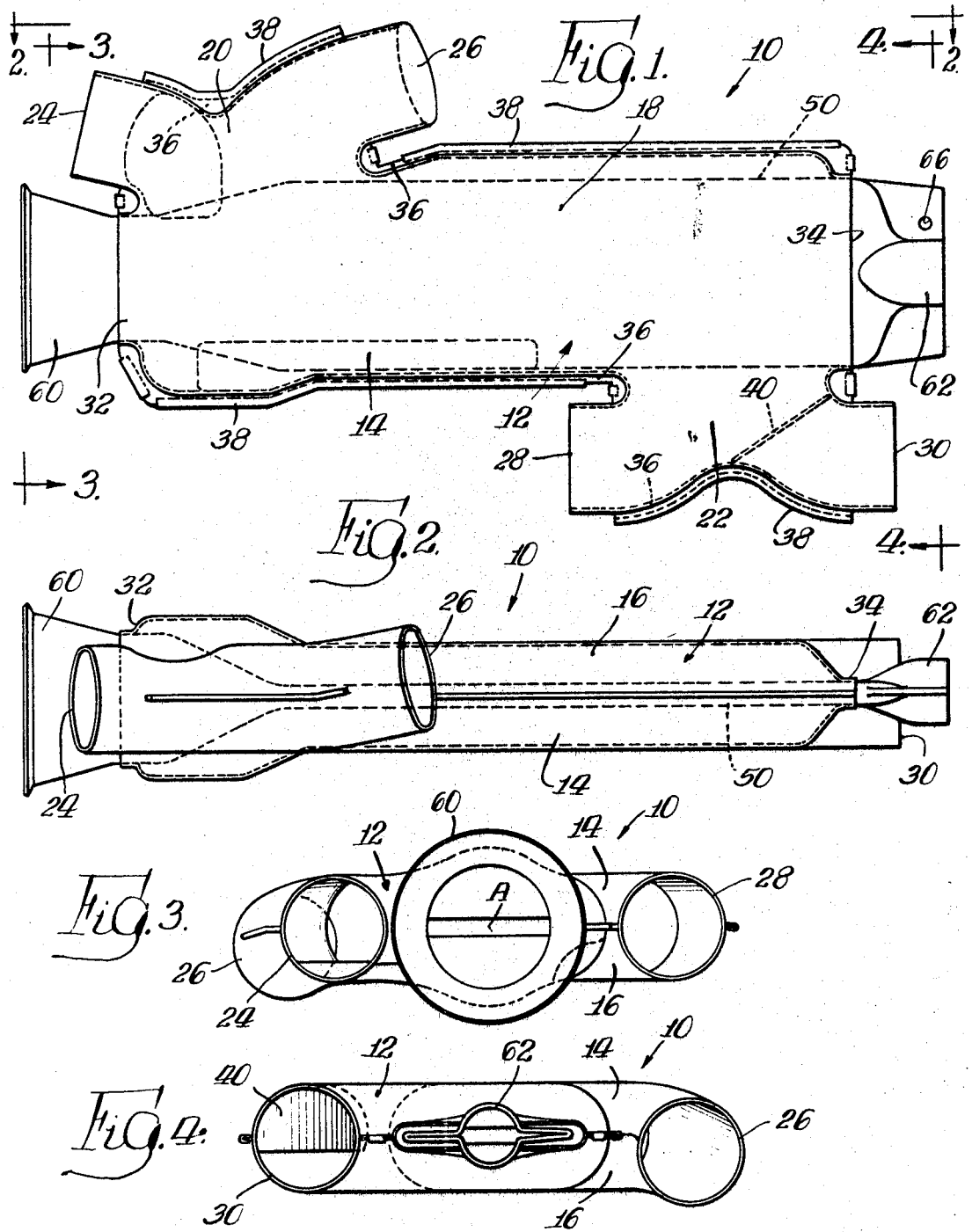

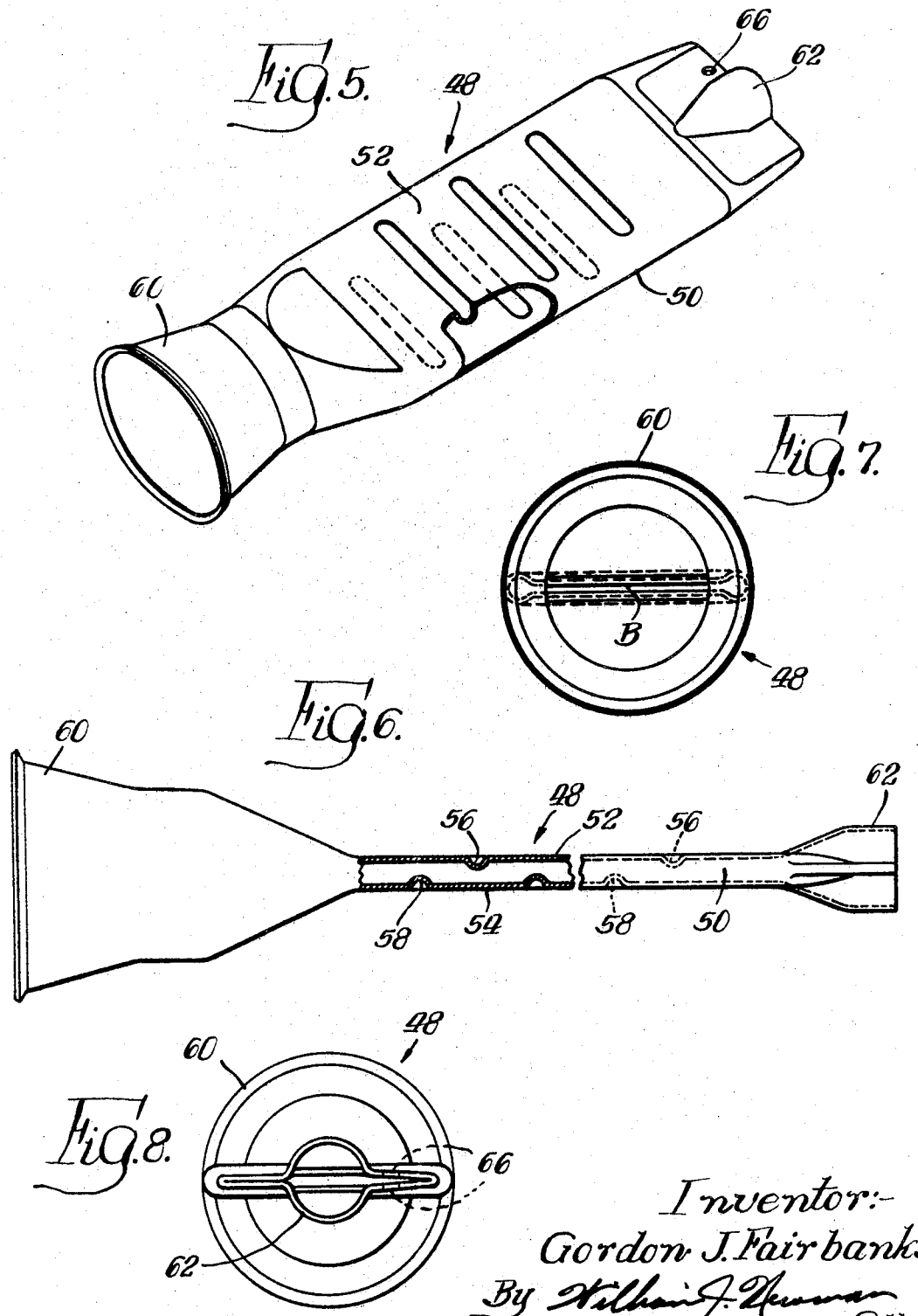

ABSTRACT OF THE DISCLOSURE

A heat exchanger housing including an elongated body portion, an inlet section having a pair of inlet extensions adjacent one corner of the body portion, and an outlet section having a pair of outlet extensions adjacent the diagonal corner of the body portion. A heat transfer tube having an elongated body portion of generally oblong cross section wherein the major cross sectional dimension is approximately eight times the minor cross sectional dimension.

My present invention relates generally to a heat exchanger and more particularly to a booster heat exchanger adapted to be incorporated in the heating and defrosting system of an automotive vehicle.

In certain automotive vehicles, exahust gas heat exchangers are used to provide warm air for passenger compartment heating and defrosting. For example, in the Volkswagen vehicle, air is heated in two exahust gas heat exchangers connected to opposed halves of the engine, and transmitted in independent paths to the passenger compartment. One disadvantage of this heating system is that under certain driving conditions the vehicle engine does not generate sufficient heat for passenger comfort at low ambient temperature. Accordingly, it is necessary in colder climates to supplement the standard heating system with a booster type heater.

In one arrangement, the booster heater is comprised of a burner and heat exchange assembly which includes a housing and a heat transfer core and which is incorporated directly in the standard heating system. Air from the standard exhaust gas heat exchangers, which may be supplemented by air from an auxiliary blower, is directed through the housing of the booster heat exchanger about the core. The burner is adapted to supply hot products of combustion to the heat transfer core from which the heat is exchanged to the air flowing through the housing. The heated air leaving the booster heat exchanger is directed in two paths to the passenger compartment, while the cooled products of combustion pass from the heat transfer core and housing through an exhaust fitting. The combustion burner, the auxiliary ventilating air blower, and the air flow from the standard exhaust gas heat exchangers to the booster heat exchanger, are preferably automatically regulated to control accurately the temperature of the air entering the passenger compartment. The details of construction and operation of a modified vehicle heating system of the foregoing type are disclosed in the copending application of Gordon J. Fairbanks and Vernon N. Tramontini, Ser. No. 438,311, filed Mar. 9, 1965, now Patent No. 3,325,100.

In the conventional booster heat exchanger incorporated in a vehicle heating system of the type described above, the heat transfer core is comprised of at least two concentric cylindrial tubes that define an annulus through which the hot products of combustions of the burner are transmitted. The effective heat transfer coefficient of this core is a function of the surface area of the outer tube and of the velocity of the combustion gas flowing through the core. The outer tube is selected to provide a surface area that will afford the desired heat transfer. The inner tube is required to increase the flow velocity through the core whereby to establish the proper flow velocity in relation to the surface area of the outer tube to obtain the desired heat transfer. There are two major unfavorable circumstances attendant to the use of the inner tube. First, because the inner tube is not cooled, it must be fabricated of a high grade stainless steel or the like and hence is expensive. Secondly, the interior volume of the inner tube, which is useless, adds undesirable bulk to the heat exchanger. Additionally, the conventional booster heat exchanger has heretofore been fabricated of at least six separate pieces or parts. Thus, assembly thereof has been time consuming and expensive.

It is an object of my present invention to provide an improved heat exchanger which may be used for example as part of a booster heater incorporated in a vehicle heating system, and which is more compact and less expensive than prior booster heat exchangers.

It is another object of my present invention to provide a heat exchanger having a single heat transfer tube wherein the outer cross sectional perimeter thereof is correlated to the inner cross sectional area to afford a predetermined desired effective heat transfer coefficient. One embodiment of heat transfer tube satisfying these requirements comprises a tube having an elongated body portion which is of generally oblong cross section with substantially parallel opposed faces, and which is preferably flattened from a cylindrical tube blank. The construction eliminates the use of an inner tube in the heat transfer core, and hence parts and assembly costs are reduced and overall size minimized.

It is another object of my present invention to provide a heat exchanger which is fabricated of only four parts—a housing formed of two sections, a core formed of a single heat transfer tube, and a baffle—whereby parts and assembly costs are minimized.

It is a still further object of my present invention to provide a booster heat exchanger wherein the elements are so arranged that it may be readily incorporated in a standard vehicle heating system, such as used in the Volkswagen vehicle, without extensive alteration of the system.

Now in order to acquaint those skilled in the art with the manner of constructing and using heat exchangers in accordance with the principles of my present invention, I shall describe in connected with the accompanying drawings a preferred embodiment of my invention.

In the drawings:

FIGURE 1 is a plan view of a heat exchanger incorporating the principles of my present invention;

FIGURE 2 is a side elevational view of the heat exchanger of FIGURE 1, taken substantially along the line 2—2 in FIGURE 1, looking in the direction indicated by the arrows;

FIGURE 3 is an end elevational view of the heat exchanger of FIGURE 1, taken substantially along the line 3—3 in FIGURE 1, looking in the direction indicated by the arrows;

FIGURE 4 is an end elevational view of the heat exchanger of FIGURE 1, taken substantially along the line 4—4 in FIGURE 1, looking in the direction indicated by the arrows;

FIGURE 5 is a perspective view of a heat transfer tube incorporating the principles of my present invention;

FIGURE 6 is a foreshortened side elevational view of the heat transfer tube of FIGURE 5, with a portion being broken away and shown in section;

FIGURE 7 is an elevational view of the left-hand end of the heat transfer tube of FIGURE 6; and FIGURE 8 is an elevational view of the right-hand end of the heat transfer tube of FIGURE 6.

Referring now to FIGURES 1–4, there is indicated generally by the reference numeral 10 a heat exchanger assembly incorporating the principles of my present invention. The assembly 10 includes a hollow housing or casing 12 comprised of two sections 14 and 16. The housing 12 has an elongated body portion 18 of generally oblong or flattened cross section. Viewing FIGURE 3, the dot A indicates the longitudinal axis of the body portion, an imaginary horizontal line passing through the longitudinal axis corresponds to the major cross sectional axis, and an imaginary vertical line passing through the longitudinal axis corresponds to the minor cross sectional axis.

The housing 12 is formed with a laterally outwardly projecting inlet section 20 adjacent one end off the body portion 18, and with a laterally outwardly projecting outlet section 22 adjacent the other end of the body portion 18. The inlet section 20 has a pair of inlet extensions 24 and 26 that respectively define first and second inlet passageways, and the outlet section 22 has a pair of outlet extensions 28 and 30 that respectively define first and second outlet passageways, all of which passageways are open to the interior of the body portion 18.

The housing 12 is also formed with a collar portion 32 at one end of the body portion 18 centrally thereof, and with a transverse flanged mouth portion 34 at the other end of the body portion. In addition, the housing section 16 has edge flanges 36, and the housing section 14 has edge flanges 38 which, in assembly, are bent or folded over the edge flanges 36 for securing the two sections together along their adjoining margins. The two housing sections 14 and 16, which are complementary, each define part of the body portion 18, part of the inlet and outlet sections 20 and 22, part of the collar portion 32 and part of the mouth portion 34. Disposed within the outlet section 22, as shown in FIGURES 1 and 4, is baffle means in the form of a baffle segment 40. The function of the baffle segment 40 will be explained hereinafter.

Referring now to FIGURES 5–8, I shall describe the heat transfer core or tube 48 of my present invention which is mounted within the housing 12. The tube 48, through which hot combustion gasses are directed, has an elongated body portion 50 of generally oblong or flattened cross section with substantially parallel opposed faces 52 and 54. The outer cross sectional perimeter of the body portion 50 is correlated to the inner cross sectional area, whereby to establish the proper flow velocity through the tube in relation to the susrface area, to afford the desired effective heat transfer coefficient. Viewing FIGURE 7, the dot B indicates the longitudinal axis of the body portion 50, an imaginary horizontal line passing through the longitudinal axis corresponds to the major cross sectional axis, and an imaginary vertical line passing through the longitudinal axis corresponds to the minor cross sectional axis. A tube wherein the dimension of the body portion 50 in the direction of the major cross sectional axis is approximately eight times the dimension in the direction of the minor cross sectional axis has proved satisfactory from a heat transfer standpoint. To create turbulence in the gasses flowing through the tube 48 for optimum heat transfer, sets of transverse inwardly directed ribs 56 and 58 are provided in the opposed faces 52 and 54 in staggered relation.

An outwardly flared collar extension 60 is formed at one end of the body portion 50, and an exhaust coupling extension 62 is formed at the other end thereof. The heat transfer tube 48 is adapted to be formed in a single piece and preferably from a cylindrical tube blank. In assembly of the housing 12 and tube 48 (FIGURES 1 and 2), the tube collar 60 is secured in the housing collar 32, and the tube body portion 50 adjacent the exhaust coupling 62 is secured in the transverse housing mouth 34. Since the booster heat exchange is fabricated of only four parts— a housing formed of two sections, a core formed of a single heat transfer tube, and a baffle—parts and assembly costs are minimized. Moreover, the use of a single heat transfer tube 48 minimizes the overall size of the heat exchanger. Normally mounted within the tube collar 60 is a conventional burner unit which includes a fuel spray nozzle and spark ignition elements. Because the burner unit forms no part of my present invention, the burner unit, the fuel supply system, the combustion air supply system, the electrical system and the control circuit are not shown. An exhaust pipe (not shown) is secured in the exhaust coupling 62 by a bolt fastened through apertures 66 in the side of the coupling.

The above described heat exchanger assembly 10, together wtih a suitable burner unit, is especially adapted to be incorporated directly in a standard vehicle heating system of the type used, for example, in the Volkswagen vehicle, wherein heated air is transmitted in independent paths to outlets in the passenger compartment. In this standard system, air is normally heated in two exhaust gas heat exchangers connected to opposed halves of the engine. Referring again to FIGURE 1, when incorporating the assembly 10 in the standard system described, the inlet extension 24 is connected to one of the exhaust gas heat exchangers, the inlet extension 26 is connected to the other exhaust gas heater exchanger, and the outlet extensions 28 and 30 are independently connected to the outlets in the passenger compartment. The noted connections are effected with conventional conduits or ducts. When the assembly 10 is incorporated in the system disclosed in the aforesaid copending application of Gordon J. Fairbanks and Vernon N. Tramontini, one of the inlet extensions, preferably extension 24, is also connected to an auxiliary ventilating air blower.

Air flowing from the one exhaust gas heat exchanger, and supplemental air flowing from the auxiliary blower, enter the inlet section 20 through the inlet extension 24, while air flowing from the other exhaust gas heat exchanger enters the inlet section 20 through the inlet extension 26. Such entering air mixes and is directed through the housing 12 about the core 48 in the direction of the outlet section 22. The burner unit mounted within the tube collar 60 is adapted to selectively supply hot products of combustion to the interior of the core 48 from which heat is exchanged to the air flowing through the housing 12. The heated air leaving the assembly 10 through the outlet extensions 28 and 30 is directed to the outlets in the passenger compartment, while the cooled products of combustion pass from the heat transfer core through the exhaust fitting 62. To equalize the flow of air through the two outlet passageways so that heat at the passenger compartment outlets is balanced, it is necessary to incorporate baffle means, such as the baffle segment 40, in the outlet section 22 to restrict the flow of air through the outlet extension 30. In the absence of baffle means, more air would flow through the outlet extension 30 than through the outlet extension 28 due to the straighter air flow path and less resistance otherwise offered by the former. The burner unit, the auxiliary ventilating air blower, and the air flow from the exhaust gas heat exchangers to the booster heater assembly 10, may be automatically controlled in the manner disclosed in the aforementioned copending application of Gordon J. Fairbanks and Vernon N. Tramontini.

The heat exchanger of my present invention may be used, as indicated, as part of a booster heater incorporated in a vehicle heating system. As a consequence of the essentially flat, four-part construction, the heat exchanger is more compact and less expensive than prior heat exchangers. Moreover, in the heat exchanger disclosed, the planes of the outer ends of the inlet extensions 24 and 26 are oblique to the plane passing through the longitudinal and minor cross sectional axes of the body portion of the housing, while the planes of the outer ends of the outlet extensions 28 and 30 are normal to the designated plane. Also, the outlet extensions 28 and 30 are arranged in opposed relation on a common axis parallel to the longitudinal axis of the body portion 18 of the housing 12. These configurations permit the heat exchanger to be readily incorporated in a standard vehicle heating system, such as used in the Volkswagen vehicle, without extensive alternation of the system, and in a manner accommodating a compact and efficient arrangement of associated air-conveying ducts. Finally, the housing sections and heat transfer tube may be inexpensively fabricated from cold rolled carbon steel, low grade stainless steel or the like.

While I have shown and described what I believe to be a preferred embodiment of my present invention, it will be understood by those skilled in the art that various rearrangement and modifications may be made therein without departing from the spirit and scope of my invention.

I claim:

1. A heat exchanger comprising: a housing including an elongated body portion, a laterally outward projecting inlet section adjacent one end of said body portion at one side thereof and having a pair of inlet extensions that define a pair of inlet passageways, and a laterally outwardly projecting outlet section adjacent the other end of said body portion at the other side thereof and having a pair of outlet extensions that define a pair of outlet passageways; and a single heat transfer tube having an elongated body portion of generally oblong cross section secured in said body portion of said housing.

2. The heat exchanger of claim 1 wherein said outlet extensions have a common axis parallel to the longitudinal axis of said body portion of said housing.

3. The heat exchanger of claim 1 wherein the planes of the outer ends of said inlet extensions are oblique to a plane passing through the longitudinal and minor cross sectional axes of said body portion of said housing, and wherein the planes of the outer ends of said outlet extensions are normal to said plane passing through the longitudinal and minor cross sectional axes of said body portion of said housing.

4. The heat exchanger of claim 1 wherein baffle means is disposed in said outlet section to equalize the flow of fluid through said outlet passageways.

References Cited

UNITED STATES PATENTS

| | | | |
|---|---|---|---|
| 2,155,666 | 4/1939 | Leidig | 165—154 |
| 2,613,920 | 10/1952 | Flint | 165—148 |
| 2,689,112 | 9/1954 | Gilmore | 165—109 |
| 2,801,828 | 8/1957 | Wilson | 165—154 |
| 2,979,310 | 4/1961 | Nicholson | 165—154 |
| 3,273,799 | 9/1966 | Fairbanks et al. | 237—12.3 |

ROBERT A. O'LEARY, *Primary Examiner.*

CHARLES SUKALO, EDWARD J. MICHAEL,
*Examiners.*